United States Patent
Tanaka et al.

[11] Patent Number: 5,516,587
[45] Date of Patent: May 14, 1996

[54] WET MULTIPLATE SYSTEM CLUTCH PLATE COATED WITH PHENOLIC RESIN MIXTURE

[75] Inventors: Tadashi Tanaka, Konan; Hidehiko Tamura, Aichi; Katsumi Sawano, Inuyama; Nobutaka Hiramatsu, Ichinomiya, all of Japan

[73] Assignee: Daido Metal Company Ltd., Nagoya, Japan

[21] Appl. No.: 247,690

[22] Filed: May 23, 1994

[30] Foreign Application Priority Data

Jun. 30, 1993 [JP] Japan .................. 5-161998

[51] Int. Cl.⁶ .............. B32B 15/08; B32B 27/42; F16D 11/00
[52] U.S. Cl. .............. 428/460; 188/251 A; 192/107 M; 192/107 R; 523/149; 523/156; 524/594
[58] Field of Search ............ 428/323, 327, 428/328, 330, 331, 368, 392, 395, 402, 404, 407, 460, 908.8; 188/251 R, 251 A; 524/406, 594; 523/153, 155, 156, 158, 149; 192/107 M, 107 R, 70.14

[56] References Cited

U.S. PATENT DOCUMENTS

| | | | |
|---|---|---|---|
| 3,684,062 | 8/1972 | Johnson | 188/251 R |
| 3,927,241 | 12/1975 | Augustin | 192/107 M |
| 4,197,223 | 4/1980 | Bartram | 260/17.2 |
| 4,539,240 | 9/1985 | Wargin | 428/64 |
| 4,540,630 | 9/1985 | Wegner et al. | 428/408 |
| 4,758,277 | 7/1988 | Spruegel et al. | 106/36 |
| 5,004,089 | 4/1991 | Hara et al. | 192/107 M |
| 5,190,991 | 3/1993 | Parker et al. | 523/149 |
| 5,268,398 | 12/1993 | Nakagawa et al. | 523/158 |

FOREIGN PATENT DOCUMENTS 2-212633  8/1990  Japan .

*Primary Examiner*—Paul J. Thibodeau
*Assistant Examiner*—Stephen Sand
*Attorney, Agent, or Firm*—Browdy and Neimark

[57] ABSTRACT

A friction member having a high frictional force, a small frictional force fluctuation and excellent wear resistance, which is composed of a substrate coated with a friction material comprising a phenolic resin, 5 to 20% by weight, based on the weight of the friction material, of at least one heat-resistant fiber selected from the group consisting of carbon fiber and aromatic polyamide fiber, 10 to 50% by weight, based on the weight of the friction material, of a solid lubricant and 5 to 30% by weight, based on the weight of the friction material, of at least one wear resistant material selected from the group consisting of $Al_2O_3$, SiC and $Si_3N_4$, and if necessary, 5 to 20% by weight, based on the weight of the friction material, of at least one soft organic compond selected from the group consisting of a fluorine-containing organic compound and a silicon-containing organic compound.

12 Claims, 5 Drawing Sheets

TEST MECHANISM

5,516,587

WET MULTIPLATE SYSTEM CLUTCH PLATE COATED WITH PHENOLIC RESIN MIXTURE

BACKGROUND OF THE INVENTION

This invention relates to a friction member for a wet multiplate system clutch plate such as differential controller utilizing a high frictional force or the like.

The conventional friction member utilizing a high frictional force includes (1) a press-cut substrate to which a friction sheet impregnated with a phenolic resin has been laminated, (2) substrate on which a metal or ceramic giving a high frictional force has been electrodeposited or welded and (3) a substrate coated with a filler-containing epoxy resin as stated in Japanese Patent Application Kokai No. 2-212,633 by a means such as coating or the like.

As a wet multiplate system clutch plate, the conventional friction members have not been able to sufficiently meet the recent requirements for transferring high power from a motor to a vehicle without adding excessive weight to the vehicle, and problems such as frictional force fluctuation caused by the so called stick slip phenomenon, vibration or unusual sound, inferior transfer efficiency of revolution and poor friction member life shortened by wear all exist in conventional friction members.

SUMMARY OF THE INVENTION

An object of this invention is to provide friction member having so high a frictional force higher than that previously obtained, having a small frictional force fluctuation and having excellent wear resistance and load carrying capacity, utilizing the characteristics that a phenolic resin is higher in friction coefficient than an epoxy resin and superior in load carrying capacity to an epoxy resin.

Other objects and advantages of this invention will become apparent from the following description.

According to this invention, there is provided a friction member composed of a substrate coated with a phenolic resin type friction material comprising (i) a phenolic resin, (ii) 5 to 20% by weight, based on the weight of the friction material, of at least one heat-resistant organic fiber selected from the group consisting of carbon fiber and aromatic polyamide fiber, (iii) 10 to 50% by weight, based on the weight of the friction material, of a solid lubricant, and (iv) 5 to 30% by weight, based on the weight of the friction material, of at least one wear resistant material selected from the group consisting of $Al_2O_3$, SiC and, $Si_3N_4$, and if necessary, (v) 5 to 20% by weight, based on the weight of the friction material, of at least one soft organic compound selected from the group consisting of a fluorine-containing organic compound and a silicon-containing organic compound.

DETAILED DESCRIPTION OF THE INVENTION

Figure 1:
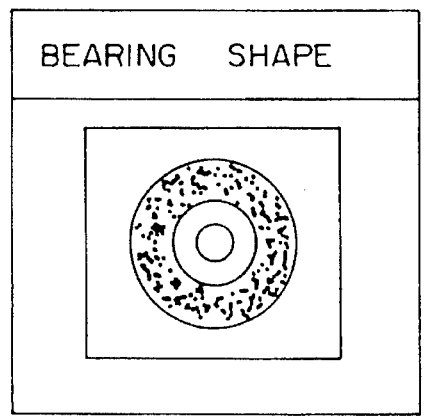
FIG. 1 shows the shape of a test specimen used in a friction and wear test of the friction member of this invention.

In this invention, as the heat-resistant organic fiber, at least one member selected from the group consisting of carbon fiber and aromatic polyamide fiber (aramid fiber) is used in a proportion of 5 to 20% by weight, preferably 10 to 15% by weight, based on the weight of the phenolic resin type friction material for improving the load carrying capacity, heat resistance and wear resistance in comparison with conventional friction members.

When the amount of the organic fiber is less than 5% by weight, the above-mentioned effect is not satisfactory, and when it exceeds 20% by weight, a frictional force fluctuation and unusual sound are caused owing to stick slip phenomenon though satisfactory load carrying capacity, heat resistance and wear resistance are obtained together with a high frictional force.

As the solid lubricant, a powder of polytetrafluoroethylene (PTFE), $MoS_2$, Gr (graphite), C, BN or the like is used in a proportion of 10 to 50% by weight, preferably 30 to 45% by weight, based on the weight of the phenolic resin type friction material for stabilizing the frictional force and preventing the stick slip phenomenon to inhibit the occurrence of vibration and unusual sound. When the amount of the solid lubricant is less than 10% by weight, the effect of preventing frictional force fluctuation and unusual sound from being caused owing to stick slip phenomenon is unsatisfactory and when it exceeds 50% by weight, it is impossible to keep the high frictional force, and the amount of the binder resin contained in the coating film becomes reduced correspondingly, resulting in a reduction in the strength and wear resistance of the coating film.

A phenolic resin is used as the binder resin in order to stabilize and fix the composition and to enhance the characteristics of the composition by synergistic effect. The phenolic resin has a higher friction coefficient, a higher hardness and higher load carrying capacity than an epoxy resin, and hence, can improve the frictional force and load carrying capacity of the composition.

As the wear resistant material, at least one member selected from the group consisting of $Al_2O_3$, SiC and $Si_3N_4$ is used in a proportion of 5 to 30% by weight, preferably 5 to 10% by weight, of the phenolic resin type friction material. The wear resistant material acts as a high frictional force stabilizer, too. When the amount of the wear resistant material is less than 5% by weight, a satisfactory effect is not obtained on wear resistance and high frictional force, particularly on high frictional force. When the amount exceeds 30% by weight, the frictional force fluctuation and unusual sound tend to be caused owing to stick slip phenomenon though wear resistance and a high frictional force are obtained.

As the soft organic compound, a fluorine-containing or silicon-containing organic compound is used in a proportion of 5 to 20% by weight, preferably 10 to 15% by weight, based on the weight of the phenolic resin type friction material to improve the impact absorption capacity and flexibility of the friction material and to thereby increase the productivity in the production of a friction member by continuously coating steel (substrate) with the friction material and press-cutting the thus coated steel. When the amount of the above compound is less than 5% by weight, a sufficient improvement in processability (namely the resistance to press-cutting stress) is not obtained. When the amount exceeds 20% by weight, frictional force fluctuation and unusual sound tend to be caused owing to stick slip phenomenon though it shows an effect on resistance to press-cutting stress and on high friction as a friction member.

A coating film having a high frictional force, a small frictional force fluctuation and excellent wear resistance can be obtained by combining a phenolic resin binder with a heat-resistant organic fiber, a solid lubricant and a wear resistant material as mentioned above. When the coating film is used as a friction member, the frictional force is stabilized, the frictional coefficient is increased as the number of revolutions increases, the stick slip phenomenon is prevented, vibration and unusual sound are not caused and the wear resistance is excellent. Thus, the performance of a friction member is greatly enhanced. In addition, the addition of a fluorine-containing or silicon-containing soft organic compound enhances the press-cutting characteristics and exhibits a great effect on the increase of productivity in the production of a friction member by continuously coating a steel with a friction material and press-cutting the coated steel.

DESCRIPTION OF PREFERRED EMBODIMENTS

This invention is explained in more detail below referring to Examples; however, this invention is not limited to the Examples.

The raw materials used in Examples and Comparative Examples are shown in Table 1.

First of all, the viscosity of a phenolic resin was adjusted with an organic solvent (methyl ethyl ketone) so that when various fillers were added to the phenolic resin the resulting mixture could be coated by a spray gun. Subsequently, the desired fillers were added to the phenolic resin to prepare a coating solution.

Separately, a S35C-H steel plate having a length of 150 mm, a width of 150 mm and a thickness of 2.5 mm was used as a coating substrate, and subjected to surface-degreasing, blast treatment and zinc phosphate film forming treatment to obtain sufficient bonding strength between a coating film and a coating substrate.

The above-mentioned coating solution was applied to the thus treated plate by a spray gun so that the thickness of the resulting coating became 30 microns, and then subjected to heat-curing treatment in a drying oven at 150° C. for one hour to obtain Sample Nos. 1 to 18 (Examples) and Sample Nos. 19 to 22 (Comparative Examples) having the compositions shown in Table 3.

Figure 2:
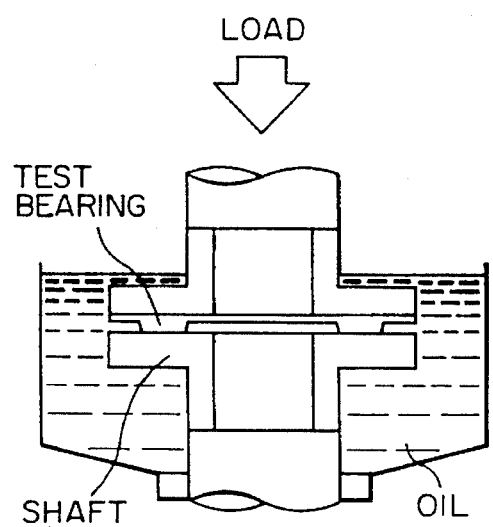
FIG. 2 shows a test mechanism in which the friction and wear test of the friction member of this invention is carried out.

The above sample was made into a bearing having a shape as shown in FIG. 1 and this bearing was tested by means of a Suzuki type tester according to the test mechanism shown in FIG. 2. The test load used was a static load, and the tester was started under a load to measure and evaluate the frictional coefficient. The test conditions were as shown in Table 2. The materials used were as shown in Table 3, the results of a friction and wear test were as shown in FIGS. 2 to 4 and the results of press-cutting test were as shown in Table 4.

Figure 3:
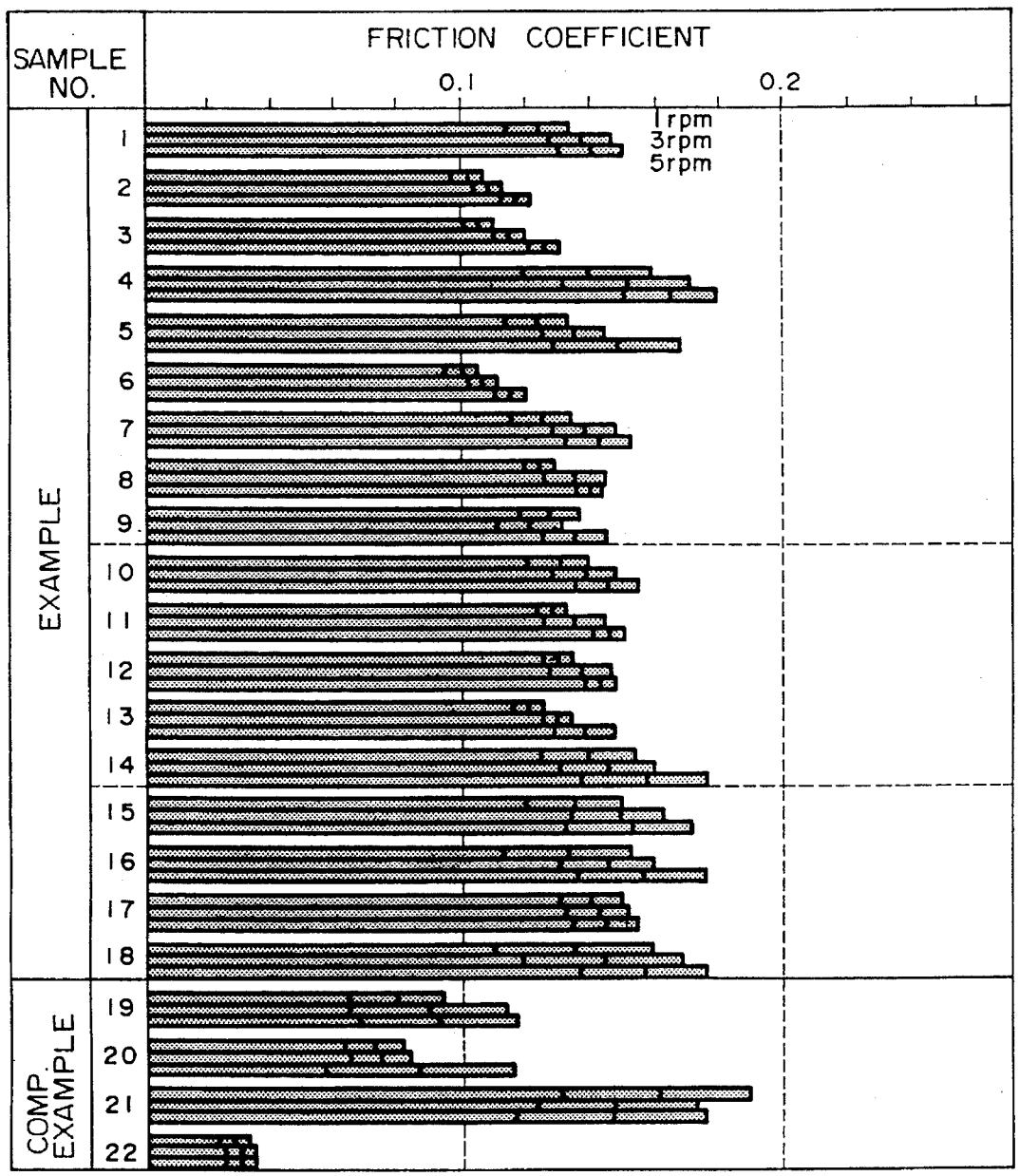
FIG. 3 is a graph showing the friction coefficient and friction coefficient fluctuation width of the friction member of this invention in comparison with a comparative example.

FIG. 3 shows the results of measurement of fluctuations of friction coefficient at the end of test period conducted under a load of 1.5 MPa at 1 rpm, 3 rpm or 5 rpm for five minutes in each case.

The maximum, minimum and average values of the friction coefficient are shown in the form of a bar graph.

Figure 4:
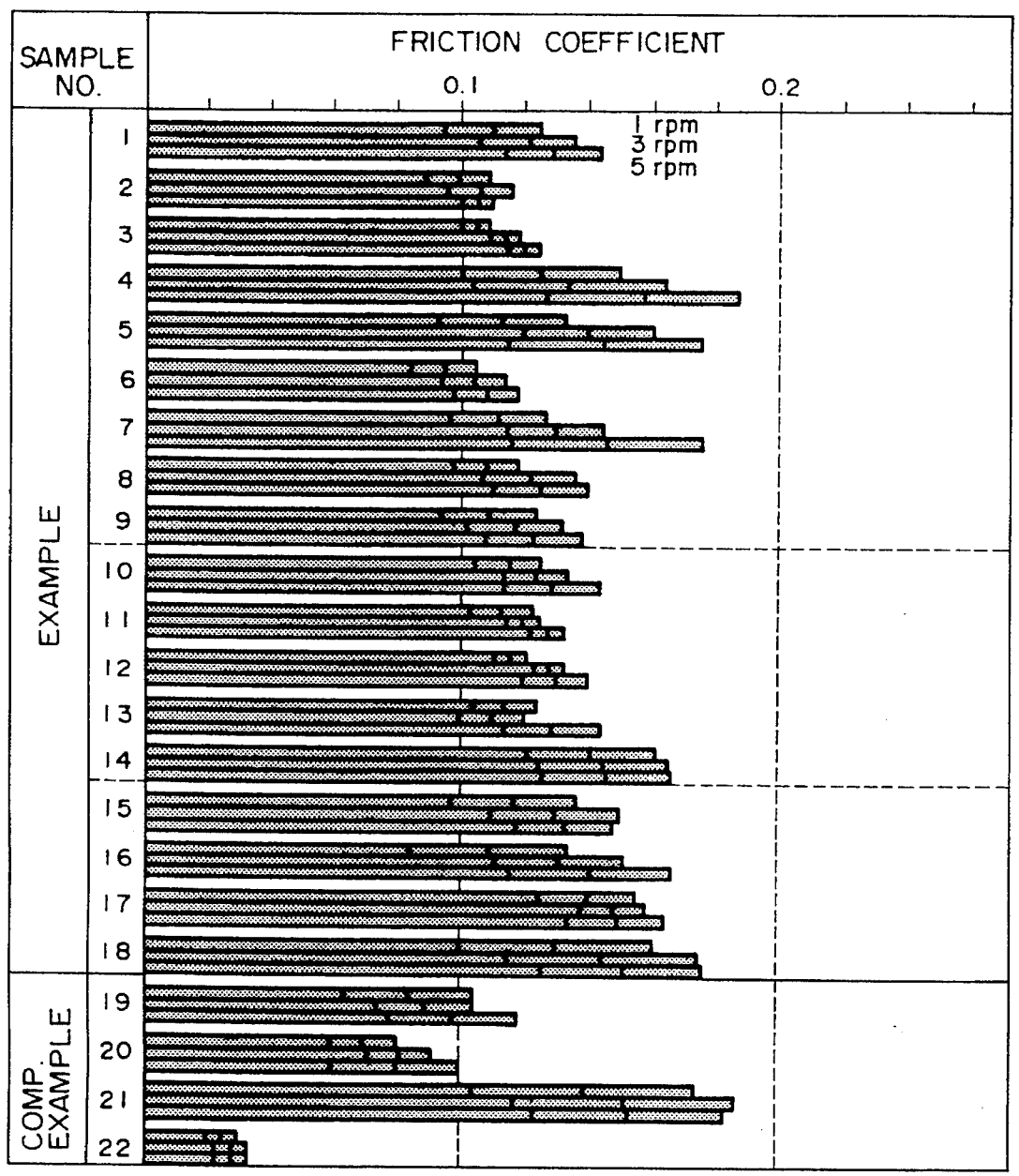
FIG. 4 is a graph showing the friction coefficient and friction coefficient fluctuation width of the friction member of this invention in comparison with a comparative example similarly to FIG. 3.

FIG. 4 shows the results of measurement in the same manner under a load of 3.0 MPa.

Figure 5:
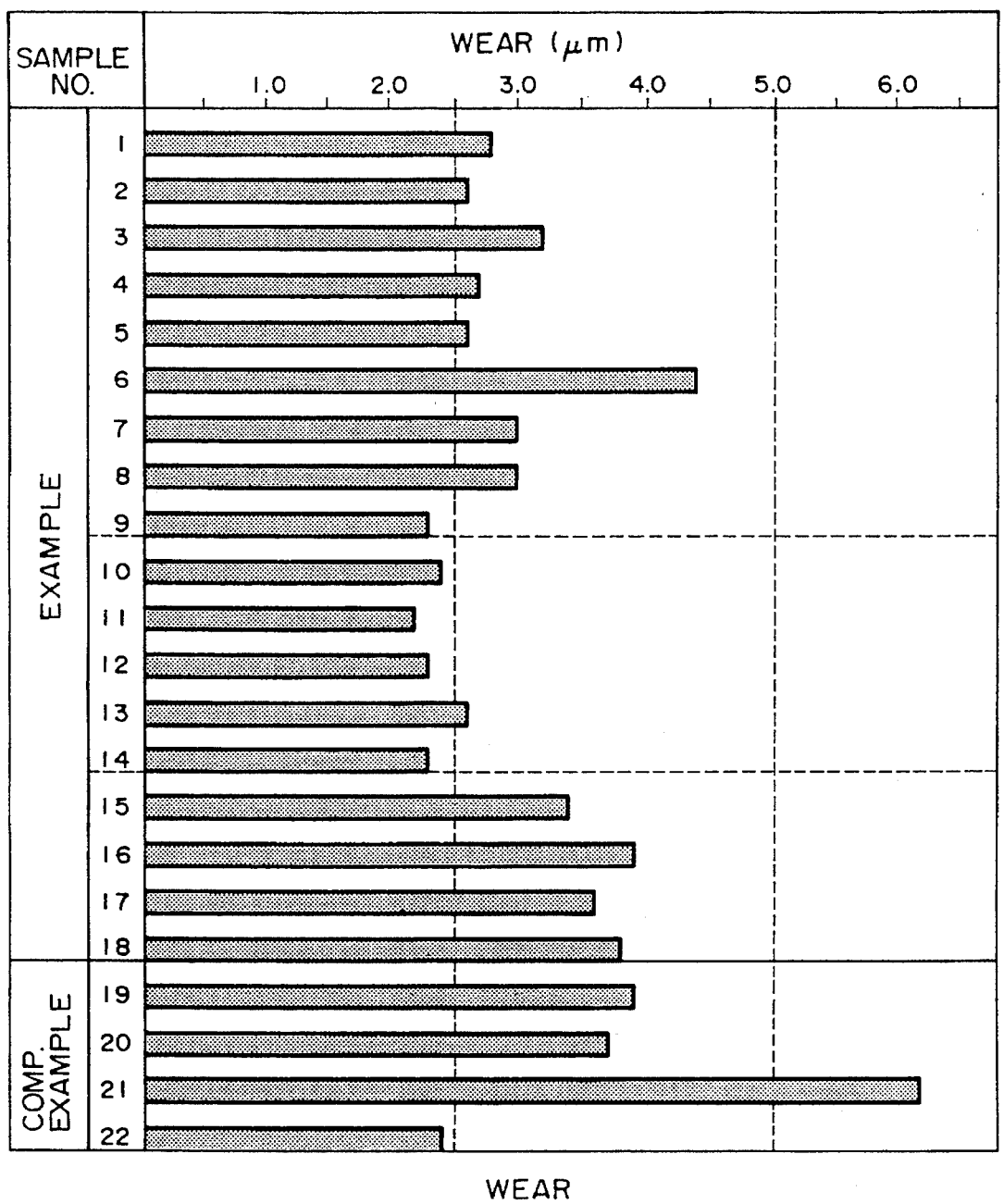
FIG. 5 is a graph showing the wear of the friction member of this invention in comparison with a comparative example.

FIG. 5 is a bar graph showing the results of measurement of wear when the test was conducted under a load of 1.5 MPa at 50 rpm for 100 hours.

As shown in FIGS. 3 to 5, Sample Nos. 1 to 18 of this invention in which a phenolic resin (PF) was used as a binder resin show higher friction coefficient and smaller wear than Sample Nos. 19 to 20 (Comparative Examples) in which an epoxy resin (EP) and a polyamideimide resin (PAI) were used. It can also be seen that the friction coefficient was increased as the number of revolutions increased, and hence, Sample Nos. 1 to 18 have excellent performance as a friction member.

Sample Nos. 1, 3 and 4 (Examples) in which car-bon fiber was contained as a heat-resistant organic fiber were smaller in wear and in friction coefficient fluctuation width than Sample No. 21 (Comparative Example) in which glass fiber which is a heat-resistant inorganic fiber was used. Sample No. 2 in which an aromatic polyamide fiber (aramid fiber) was used as a heat-resistant organic fiber shows the same results as Sample Nos. 1, 3 and 4. Also, Sample No. 3 (Example) is a case of the lower limit of the heat-resistant organic fiber content and shows a slight reduction in wear resistance. On the other hand, Sample No. 4 (Example) is a case of the upper limit of the heat-resistant organic fiber content and shows a slight increase in wear resistance and fluctuation of friction coefficient.

Sample Nos. 5 to 9 in which a powder of PTFE, molybdenum disulfide (MoS2), boron nitride (BN) or carbon was contained as the solid lubricant show a small fluctuation of friction coefficient and exhibit that an effect of preventing the frictional force fluctuation and unusual sound from being caused owing to stick slip phenomenon is obtained. Sample No. 5 is a case of the lower limit of the solid lubricant content and shows that the friction coefficient fluctuation increases somewhat. On the other hand, Sample No. 6 is a case of the upper limit of the solid lubricant content and shows a slight reduction in frictional force and wear resistance. Incidentally, Sample No. 22 (Comparative Example) is a case in which metallic lead (Pb) excellent in lubricity was added and shows a small friction coefficient. This sample was not suitable for friction member.

Sample Nos. 10 to 14 (Examples) in which $Al_2O_3$, SiC or $Si_3N_4$ was contained as a wear resistant material show a high frictional force and good wear resistance. Sample No. 13 (Example) is a case of the lower limit of the wear resistant material content and shows a slight reduction in frictional force. Sample No. 14 (Example) is a case of the upper limit of the wear resistant material content, and shows a slight increase in friction coefficient fluctuation.

Figure 6:
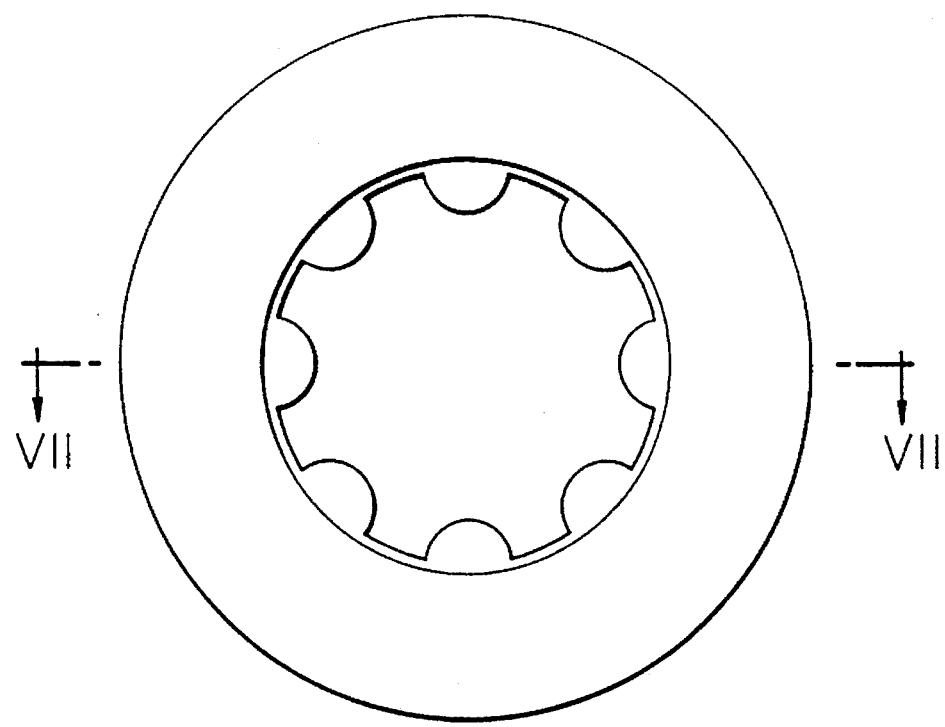
FIG. 6 is a plan view showing the shape of a press-cut test specimen of the friction member of this invention and FIG. 7 is a sectional view showing the shape of a press-cut test specimen of the friction member of this invention.
Figure 7:
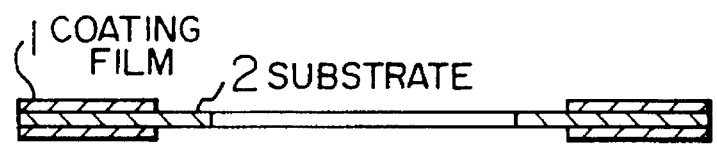

Subsequently, a press-cutting test was conducted. Samples which had been subjected to coating in the above-mentioned manner and then heat-curing treatment were press-cut to the shape shown in FIG. 6 or 7 and chipped edges and cracks of the coating film were observed. The results obtained were as shown in Table 4.

Sample Nos. 15 to 18 (Examples) in which a fluorine-containing or silicon-containing soft organic compound was contained were high in resistance to press-cutting stress and hence chipped edges and cracks were little formed, Hence, Sample Nos. 15 to 18 were excellent in press-cutting characteristics.

TABLE 1

| Raw materials used | | | |
|---|---|---|---|
| Composition | Kind | A manufacturer | Article No. |
| Binder resin | Phenolic resin | SHOWA HIGH-POLYMER | BLS-715 (Liquid resol resin) |
| | Epoxy resin | DAINIPPON INK & CHEMICALS | Epiclon 1050-70X |
| | Polyamide-imide resin | AMOCO CORP. | AI-10 |
| Heat resistant fiber | Carbon fiber | Kureha Chemical | M-101S |
| | Aramid fiber | Du Pont | Kevlar-29 |
| | Glass fiber | Nitto Boseki | PF A-101 |
| Solid lubricant | PTFE powder | DAIKIN INDUSTRIES | Lublon L-5 |
| | MoS$_2$ powder | SUMICO | Molypowder-PS |
| | Gr powder | Nippon Carbon | GA-5 |
| | C powder | KANEBO | Bellpearl C-200 |
| | BN powder | DENKA | SP-1 |
| | Pb powder | Fukuda Metal | PL-200 |
| Wear resistant, high frictional force stabilizer | Al$_2$O$_3$ powder | Nikkei Kako | Average particle size of 5 μm |
| | Si$_3$N$_4$ | Shin-Etsu Chemical | KSU-10SP |
| | SiC | IBIDEN | Betarundum |
| Soft organic compound | Fluorine rubber | DAIKIN INDUSTRIES | DPA-371 |
| | Silicone resin | Toshiba Silicon | Tospearl 240 |

TABLE 2

| Test conditions | |
|---|---|
| Items | Dimension and the like |
| Test specimen size | φ41.5 × φ25 mm, t = 2.5 mm |
| Number of revolution | 1, 3 or 5 rpm/50 rpm |
| Load | 1.5 or 3.0 MPa/1.5 MPa |
| Time | 5 min/100 hrs |
| Lubricant | Hypoid gear oil |
| Temperature | 70° C. |
| Lubricating method | Oil bath immersion |
| Counter member | |
| Kind | S 55 C |
| Roughness | 1.0 R$_{max}$ μm |
| Hardness | 500–600 (Hv 10) |

TABLE 3

| Sample No. | Binder resin | | | Heat resistant fiber | | | Solid lubricant | | | | | | Wear resistant, high frictional force stabilizer | | | Soft organic compound | |
|---|---|---|---|---|---|---|---|---|---|---|---|---|---|---|---|---|---|
| | PF | EP | PAI | CF | Aramid | GF | PTFE | MoS$_2$ | Gr | BN | C | Pb | Al$_2$O$_3$ | Si$_3$N$_4$ | SiC | Fluorine-containing rubber | Silicone Resine |
| Example | | | | | | | | | | | | | | | | | |
| 1 | 50 | — | — | 10 | — | — | 10 | — | 30 | — | — | — | — | — | — | — | — |
| 2 | 50 | — | — | — | 10 | — | 10 | — | 30 | — | — | — | — | — | — | — | — |
| 3 | 55 | — | — | 5 | — | — | 10 | — | 30 | — | — | — | — | — | — | — | — |
| 4 | 40 | — | — | 20 | — | — | 10 | — | 30 | — | — | — | — | — | — | — | — |
| 5 | 80 | — | — | 10 | — | — | 5 | — | 5 | — | — | — | — | — | — | — | — |
| 6 | 40 | — | — | 10 | — | — | 15 | — | 35 | — | — | — | — | — | — | — | — |
| 7 | 50 | — | — | 10 | — | — | 10 | 30 | — | — | — | — | — | — | — | — | — |
| 8 | 50 | — | — | 10 | — | — | 10 | — | — | 30 | — | — | — | — | — | — | — |
| 9 | 50 | — | — | 10 | — | — | 10 | — | — | — | 30 | — | — | — | — | — | — |
| 10 | 40 | — | — | 10 | — | — | 10 | 30 | — | — | — | — | 10 | — | — | — | — |
| 11 | 40 | — | — | 10 | — | — | 10 | 30 | — | — | — | — | — | 10 | — | — | — |
| 12 | 40 | — | — | 10 | — | — | 10 | 30 | — | — | — | — | — | — | 10 | — | — |
| 13 | 45 | — | — | 10 | — | — | 10 | 30 | — | — | — | — | 5 | — | — | — | — |
| 14 | 30 | — | — | 10 | — | — | 5 | 25 | — | — | — | — | 30 | — | — | — | — |
| 15 | 30 | — | — | 10 | — | — | 10 | 30 | — | — | — | — | 10 | — | — | — | 10 |
| 16 | 40 | — | — | 10 | — | — | 10 | — | 30 | — | — | — | — | — | — | — | 10 |
| 17 | 40 | — | — | 10 | — | — | 10 | — | 30 | — | — | — | — | — | — | 10 | — |
| 18 | 35 | — | — | 10 | — | — | 10 | — | 30 | — | — | — | — | — | — | — | 15 |
| Comp. Example | | | | | | | | | | | | | | | | | |
| 19 | 50 | — | — | — | — | 10 | 10 | — | 30 | — | — | — | — | — | — | — | — |
| 20 | — | 50 | — | 10 | — | — | 10 | — | 30 | — | — | — | — | — | — | — | — |
| 21 | — | — | 50 | 10 | — | — | 10 | — | 30 | — | — | — | — | — | — | — | — |
| 22 | 50 | — | — | 10 | — | — | 10 | — | — | — | — | 30 | — | — | — | — | — |

TABLE 4

Occurrence of Chipped edges and cracks
of coating film in press-cutting

| Sample No. | Film thickness (μ) | Evaluation results chipped edges | Cracks |
|---|---|---|---|
| Example | | | |
| 15 | 41 | II | I |
| 16 | 28 | II | I |
| 17 | 35 | II | I |
| 18 | 29 | I | I |
| Comp. Example | | | |
| 19 | 34 | III | III |
| 20 | 30 | III | II |
| 21 | 36 | III | III |
| 22 | 33 | III | III |

Note: Evaluation criterion:
I: No problem
II: Caused but usable
III: Caused and not usable

What is claimed is:

1. A wet multiple system clutch plate comprising a substrate coated with a phenolic resin friction material consisting essentially of 5 to 20% by weight, based on the weight of the friction material, of at least one heat resistant organic fiber selected from the group consisting of carbon fiber and aromatic polyamide fiber, 10 to 50% by weight, based on the weight of the friction material, of a solid lubricant, 5 to 30% by weight, based on the weight of the friction material, of at least one wear resistant material selected from the group consisting of $Al_2O_3$, SiC and $Si_3N_4$, and 30 to 80% by weight phenolic resin.

2. The clutch plate according to claim 1, wherein the phenolic resin friction material further comprises 5 to 20% by weight of at least one organic compound selected from the group consisting of a fluorine-containing organic compound and a silicon-containing organic compound.

3. The clutch plate according to claim 1, wherein the substrate is a steel plate.

4. The clutch plate according to claim 1, wherein the solid lubricant is polytetrafluoroethylene powder, molybdenum disulfide powder, boron nitride powder or carbon powder.

5. The clutch plate according to claim 2, wherein the substrate is a steel plate.

6. The clutch plate according to claim 4, wherein the substrate is a steel plate.

7. The clutch plate according to claim 1 wherein said heat resistant organic fiber is present in an amount of 10–15% by weight, based on the weight of the friction material.

8. The clutch plate according to claim 1 wherein said solid lubricant is present in an amount of 30–45% by weight, based on the weight of the friction material.

9. The clutch plate according to claim 1 wherein the wear resistant material is present in an amount of 5–10% by weight, based on the weight of the friction material.

10. The clutch plate according to claim 2 wherein said fluorine-containing organic compound or silicon-containing organic compound is present in an amount of 10–15% by weight, based on the weight of said friction material.

11. The clutch plate according to claim 1 wherein said heat-resistant organic fiber is present in an amount of 10–15% by weight, said solid lubricant is present in an amount of 30–45% by weight, and said wear resistant material is present in an amount of 5–10% by weight, all based on the weight of the friction material.

12. The clutch plate according to claim 2 wherein said heat-resistant organic fiber is present in an amount of 10–15% by weight, said solid lubricant is present in an amount of 30–45% by weight, said wear resistant material is present in an amount of 5–10% by weight, and said fluorine-containing or silicon-containing organic compound is present in an amount of 10–15% by weight, all based on the weight of the friction material.

* * * * *